UNITED STATES PATENT OFFICE.

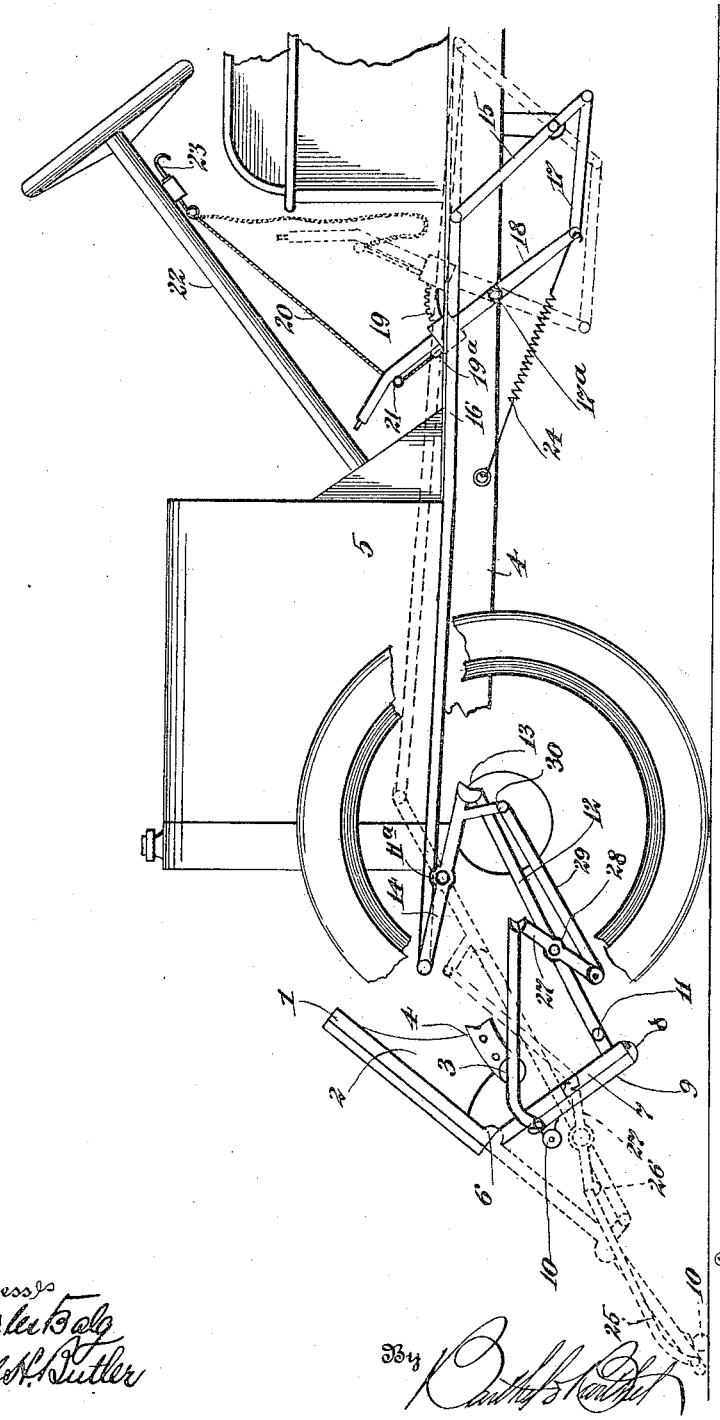

FRANCK GIRARDI, OF DETROIT, MICHIGAN.

AUTOMOBILE-FENDER.

1,209,957.  Specification of Letters Patent.  Patented Dec. 26, 1916.

Application filed May 11, 1916. Serial No. 96,767.

*To all whom it may concern:*

Be it known that I, FRANCK GIRARDI, a subject of the King of Italy, residing at Detroit, in the county of Wayne and State of Michigan, have invented certain new and useful Improvements in Automobile-Fenders, of which the following is a specification, reference being had therein to the accompanying drawings.

This invention relates to fenders for motor vehicles, and the objects of my invention are, first, to provide a strong and durable fender that may be easily attached to the forward end of an automobile to prevent pedestrians from being injured by the wheels of the automobile when accidentally run down or collided with; second, to furnish an automobile with simple and inexpensive fender having an automatically extended section that can be easily and quickly released by the chauffeur of an automobile to scoop up or present a guard which will prevent a person from being run over by the automobile, and third, to provide a fender construction which may be folded or collapsed to occupy a comparatively small space when not attached to an automobile.

I attain the above and other objects by a mechanical construction that will be hereinafter specifically described and then claimed, and reference will now be had to the drawing, wherein there is shown a side elevation of a portion of an automobile provided with a fender in accordance with our invention, showing the normal position of the fender in full lines and an abnormal or extended position, by dotted lines.

The fender comprises a sectional main frame having the upper section 1 thereof provided with side brackets 2 and these brackets are rigidly secured, as at 3, to the forward ends of the side frames 4 of an automobile 5.

Connected to the upper section 1 of the fender by rule joints or hinges 6, is a lower section 7 and hinged or pivotally connected to the lower edge of the lower section 7, as at 8, is a bottom section 9. This bottom section extends in proximity to the ground and has side rollers 10 adapted to support the bottom section when extended. The bottom section 9 is normally folded against the lower section 7 and said lower section normally disposed at an angle relative to the fixed upper section of the fender. Pivotally connected to one side of the lower fender section 7, as at 11, is a rod 12 having a rule joint connection 13 with a lever 14 pivotally connected, as at $11^a$, to one of the side frames 4 of the automobile. The same side frame of the automobile, adjacent the automobile seat for the operator or chauffeur of the automobile, is provided with a pivoted bell crank 15 and the upper end of this bell crank is connected to the lever 14 by a reach rod 16. The lower end of the bell crank 15 is connected by a link 17 to the lower end of an operating lever 18 pivotally connected, as at $17^a$, to the frame 4. The operating lever 18 extends upwardly to a position convenient to the operator or chauffeur of the automobile and a conventional form of rack 19 and pawl $19^a$ mechanism is employed for holding the operating lever 18 in an adjusted position. Connected to the pawl $19^a$ is a cable 20 trained over the sheave 21, carried by the operating lever 18. The cable 20 extends upwardly toward the steering post 22 of the automobile 5 and is connected to a pull member 23 carried by the post, whereby the chauffeur of the automobile can quickly shift the pawl $19^a$ to release the operating lever 18. This lever has the lower end thereof connected to a coiled retractile spring 24 attached to the side frame 4 of the automobile, and when the pawl $19^a$ is released, the retractile spring shifts the lower section 7 of the main fender frame forward to the dotted position shown.

The bottom of section 9 of the fender has a pivoted side arm 25 connected by a rule joint 26 to a bell crank 27, pivotally connected, as at 28, to the side of the rod 12. The bell crank 27 is connected by a link 29 to a rigid branch 30 of the lever 14, consequently when this lever is moved, the bottom section 9 of the fender is shifted. When the lower section 7 is swung to an extended position, the bottom section 9 is unfolded and extended toward the ground with the rollers or wheels 10 supporting the same whereby a person or animal may be scooped up or deflected to one side.

The fender sections 1, 7 and 9 may be made of light and durable metal supporting a yieldable net work, and cushioning material, as rubber, may be used on the framework of the fender.

It is thought that the operation and utility of the fender will be apparent without further description, and while in the drawing there is illustrated a preferred embodiment of my invention, it is to be understood that the structural elements are susceptible to such variations and modifications as fall within the scope of the appended claims.

What I claim is:

1. A fender adapted for attachment to the forward ends of the side frame of an automobile, comprising an upper fender section having brackets adapted to be rigidly secured to the forward ends of side frames, a lower section pivotally connected to the lower section and normally folded relative thereto, spring actuated means adapted to move said lower section in one direction relative to said upper section, and means set in motion by the first mentioned means adapted to move said bottom section relative to said lower section.

2. An automobile fender comprising an upper section having brackets adapted for attachment to the forward ends of an automobile side frames, a lower section connected to said upper section and held normally out of alinement therewith, a bottom section connected to said lower section and folded normally against the front side thereof, spring actuated means adapted to be manually released to swing said lower section in alinement with said upper section, and means set in motion by the first mentioned means adapted to extend the bottom section relative to said lower section.

3. An automobile fender comprising an upper section having brackets adapted for attachment to the forward ends of automobile side frames, a lower section having rule joint connections with said upper section, a bottom section pivotally connected to the lower edge of said lower section, a rod connected to one side of said lower section, a lever adapted to be pivotally mounted upon an automobile side frame and connected to said rod, a bell crank adapted to be pivotally mounted on said automobile frame, and having one end thereof connected to said lever, an operating lever adapted to be pivotally connected to said automobile side frame, a link connecting the lower end of said operating lever to said bell crank, and means actuated by a movement of the first mentioned lever adapted to move said bottom section relative to said lower section.

In testimony whereof I affix my signature in the presence of two witnesses.

FRANCK GIRARDI.

Witnesses:
KARL H. BUTLER,
ANNA M. DORR.

Copies of this patent may be obtained for five cents each, by addressing the "Commissioner of Patents, Washington, D. C."